US010620985B2

(12) United States Patent
Dabak et al.

(10) Patent No.: US 10,620,985 B2
(45) Date of Patent: Apr. 14, 2020

(54) TRANSPARENT CODE PATCHING USING A HYPERVISOR

(71) Applicant: NICIRA, INC., Palo Alto, CA (US)

(72) Inventors: Prasad Dabak, Pune (IN); Achindra Bhatnagar, Pune (IN)

(73) Assignee: Nicira, Inc., Palo Alto, CA (US)

( * ) Notice: Subject to any disclaimer, the term of this patent is extended or adjusted under 35 U.S.C. 154(b) by 167 days.

(21) Appl. No.: 15/643,503

(22) Filed: Jul. 7, 2017

(65) Prior Publication Data

US 2018/0307516 A1 Oct. 25, 2018

(30) Foreign Application Priority Data

Apr. 21, 2017 (IN) .............................. 201741014233

(51) Int. Cl.
*G06F 9/455* (2018.01)
*G06F 12/1009* (2016.01)
*G06F 8/65* (2018.01)
*G06F 12/14* (2006.01)

(52) U.S. Cl.
CPC ............ *G06F 9/45558* (2013.01); *G06F 8/65* (2013.01); *G06F 12/1009* (2013.01); *G06F 12/1425* (2013.01); *G06F 2009/45583* (2013.01); *G06F 2009/45591* (2013.01); *G06F 2212/1052* (2013.01); *G06F 2212/152* (2013.01)

(58) Field of Classification Search
CPC .................................................. G06F 9/45558
See application file for complete search history.

(56) References Cited

U.S. PATENT DOCUMENTS

| 8,285,958 | B1 * | 10/2012 | Sallam | G06F 12/145 |
| | | | | 711/165 |
| 8,510,756 | B1 * | 8/2013 | Koryakin | G06F 9/45558 |
| | | | | 718/1 |
| 2008/0104588 | A1 * | 5/2008 | Barber | G06F 8/63 |
| | | | | 718/1 |
| 2009/0187697 | A1 * | 7/2009 | Serebrin | G06F 9/455 |
| | | | | 711/6 |

* cited by examiner

*Primary Examiner* — Sisley N Kim
(74) *Attorney, Agent, or Firm* — Fish & Richardson P.C.

(57) ABSTRACT

An example method of managing guest code in a virtualized computing instance of a virtualized computing system includes: receiving, at a hypervisor that manages the virtualized computing instance, identifiers for a first guest-physical memory page, which stores a patched version of the guest code, and a second guest-physical memory page, which stores an original version of the guest code; modifying an entry in a nested page table (NPT), which is associated with the first guest-physical memory page, to cause an exception to the hypervisor in response to a first read operation, performed by first software in the virtualized computing instance, which targets the first guest-physical memory page; and executing, at the hypervisor in response to the exception, a second read operation that emulates the first read operation, but targets the second guest-physical memory page.

20 Claims, 5 Drawing Sheets

TRANSPARENT CODE PATCHING USING A HYPERVISOR

RELATED APPLICATION

Benefit is claimed under 35 U.S.C. 119(a)-(d) to Foreign Application Serial No. 201741014233 filed in India entitled "TRANSPARENT CODE PATCHING USING A HYPERVISOR", filed on Apr. 21, 2017, by Nicira, Inc., which is herein incorporated in its entirety by reference for all purposes.

BACKGROUND

Security software executing on a computer needs to intercept various events, such as file system activity, registry activity, process/thread creation module loads/unloads, and the like. An operating system (OS) typically provides application programming interfaces (APIs) and/or frameworks that can be used to intercept some events. However, it may be desirable for the security software to intercept events that do not have legitimate interception mechanisms provided by the OS. The security software can address this issue by patching the kernel code of the OS to intercept the events of interest.

The advent of kernel patch protection (KPP) in some OS'es, however, defeats this scheme. KPP is introduced to prevent privileged software from patching kernel code and/or critical kernel data structures. KPP typically takes a snapshot of the kernel code (and other critical code), as well as critical data structures, and then periodically executes and matches checksums to verify that the protected code/data remains unchanged. KPP also updates checksums when there are legitimate modifications to data structures. KPP detects any modifications to the protected code/data, considers such modifications malicious, and immediately shuts down the OS. While KPP is designed to protect against malicious software, KPP also affects operation of legitimate security software that needs to patch kernel code to operate as designed.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Techniques for transparent code patching using a hypervisor are described. In an embodiment, the virtualized computing instance includes a hypervisor and a virtualized computing instance managed by the hypervisor (e.g., a virtual machine). The virtualized computing instance includes a guest operating system (OS) and a security agent installed therein. The security agent cooperates with the hypervisor to patch the kernel of the guest OS in the presence of kernel patch protection (KPP) software of the guest OS. The security agent and the hypervisor cooperate to present that patched kernel code in the execution stream and the original kernel code in the data stream. In this manner, guest OS will execute the patched kernel code, but the KPP software will read the original kernel code during verification. This allows the security agent to patch the kernel code to intercept various events during execution by the guest OS, while concurrently rendering the patch undetectable by the KPP software. The techniques for patching code described herein can be used for other applications, such as patching code for debug purposes and for dynamic patching of code. These and other aspects are described below with respect to the drawings.

Figure 1:
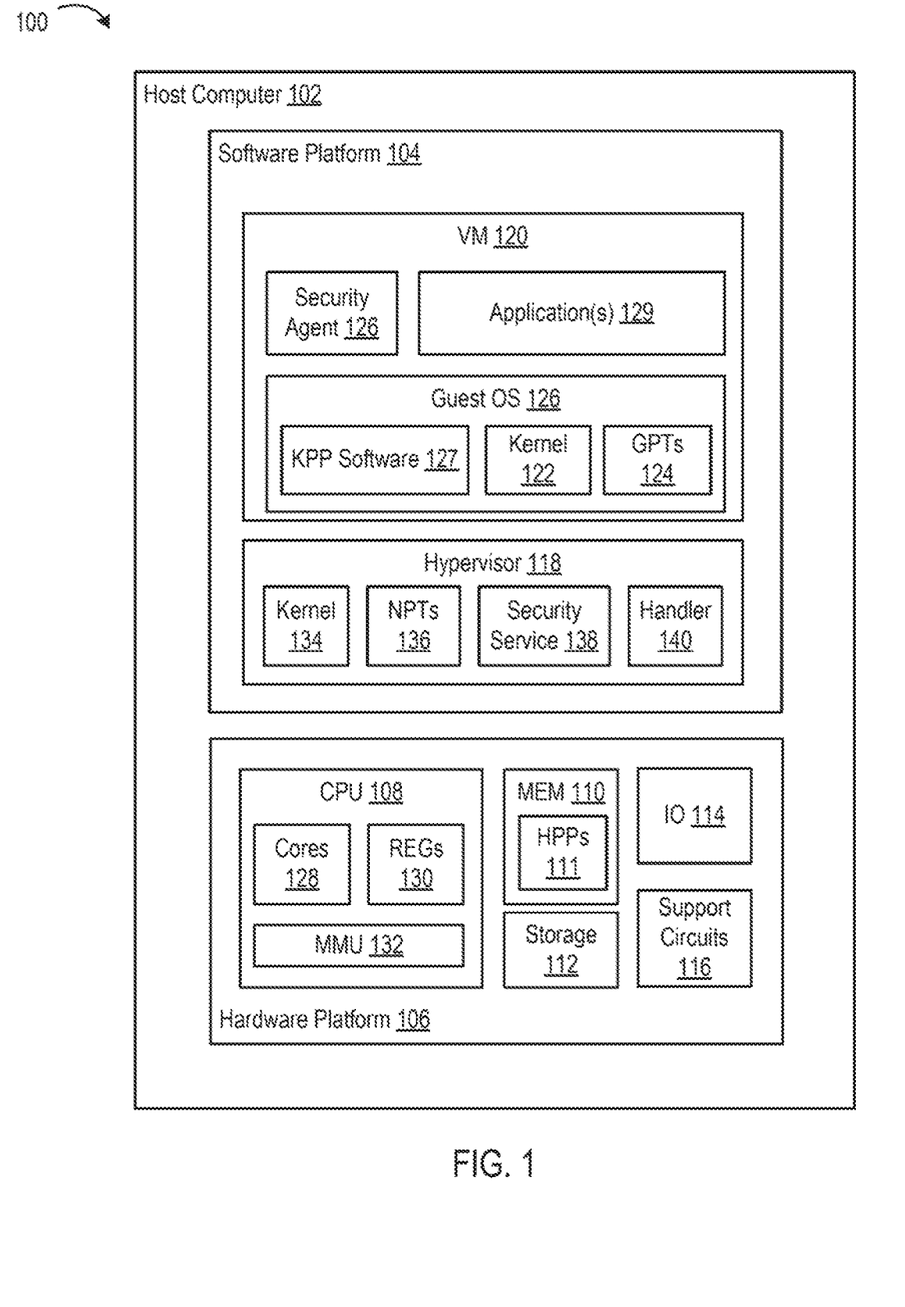
FIG. 1 is a block diagram depicting a virtualized computing system according to an embodiment.

FIG. 1 is a block diagram depicting a virtualized computing system 100 according to an embodiment. Virtualized computing system 100 includes a host computer 102 having a software platform 104 executing on a hardware platform 106. Hardware platform 106 may include conventional components of a computing device, such as a central processing unit (CPU) 108, system memory (MEM) 110, a storage system (storage) 112, input/output devices (IO) 114, and various support circuits 116. CPU 108 is configured to execute instructions, for example, executable instructions that perform one or more operations described herein and may be stored in system memory 110 and storage system 112. System memory 110 is a device allowing information, such as executable instructions, virtual disks, configurations, and other data, to be stored and retrieved. System memory 110 may include, for example, one or more random access memory (RAM) modules. Storage system 112 includes local storage devices (e.g., one or more hard disks, flash memory modules, solid state disks, and optical disks) and/or a storage interface that enables host computer 102 to communicate with one or more network data storage systems. Examples of a storage interface are a host bus adapter (HBA) that couples host computer 102 to one or more storage arrays, such as a storage area network (SAN) or a network-attached storage (NAS), as well as other network data storage systems. Input/output devices 114 include conventional interfaces known in the art, such as one or more network interfaces. Support circuits 116 include conventional cache, power supplies, clock circuits, data registers, and the like.

CPU 108 includes one or more cores 128, various registers 130, and a memory management unit (MMU) 132. Each core 128 is a microprocessor, such as an x86 microprocessor or the like. Registers 130 include program execution registers for use by code executing on cores 128 and system registers for use by code to configure CPU 108. MMU 132 supports paging of system memory 110. Paging provides a "virtual memory" environment where a virtual address space is divided into pages, which are either stored in system memory 110 (e.g., host physical pages (HPPs) 111) or in storage 112. "Pages" are individually addressable units of memory. Each page (also referred to herein as a "memory page") includes a plurality of separately addressable data words, each of which in turn includes one or more bytes. Pages are identified by addresses referred to as "page numbers." CPU 108 can support one or more page sizes. For example, modern x86 CPUs can support 4 kilobyte (KB), 2 megabyte (Mb), 4 MB, and 1 gigabyte (GB) page sizes. Other CPUs may support other page sizes.

MMU 132 translates virtual addresses in the virtual address space into physical addresses of system memory 110. MMU 132 also determines access rights for each address translation. An executive (e.g., operating system, hypervisor, etc., or combination thereof) exposes a hierarchy of page tables to CPU 108 for use by MMU 132 to perform address translations. A page table hierarchy can be exposed to CPU 108 by writing pointer(s) to control registers and/or control structures accessible by MMU 132. Page tables can include different types of paging structures depending on the number of levels in the hierarchy. A paging structure includes entries, each of which specifies an access policy and a reference to another paging structure or to a memory page. The access policy for a page can include read/write/execute permissions, user/supervisor permissions, and the like.

CPU 108 can include hardware-assisted virtualization features, such as support for hardware virtualization of MMU 118. For example, modern x86 processors commercially available from Intel Corporation include support for MMU virtualization using extended page tables (EPTs). Likewise, modem x86 processors from Advanced Micro Devices, Inc. include support for MMU virtualization using Rapid Virtualization indexing (RVI). Other processor platforms may support similar MMU virtualization. In general, CPU 108 can implement hardware MMU virtualization using nested page tables (NPTs). In a virtualized computing system, a guest OS in a VM maintains page tables (referred to as guest page tables (GPTs)) for translating virtual addresses to addresses for a virtual memory provided by the hypervisor (referred to as guest-physical addresses). The hypervisor maintains NPTs that translate guest-physical addresses to physical addresses for system memory 110 (referred to as host-physical addresses or machine addresses). Each of the guest OS and the hypervisor exposes the guest paging structures and the NPTs, respectively, to the CPU 108. MMU 132 translates virtual addresses to host-physical addresses by walking the guest page structures to obtain guest-physical addresses, which are used to walk the NPTs to obtain host-physical addresses.

Software platform 104 includes a virtualization layer that abstracts processor, memory, storage, and networking resources of hardware platform 106 into one or more virtual machines ("VMs") that run concurrently on host computer 102. The VMs run on top of the virtualization layer, referred to herein as a hypervisor, which enables sharing of the hardware resources by the VMs. In the example shown, software platform 104 includes hypervisor 118 that supports a VM 120. One example of hypervisor 118 that may be used in an embodiment described herein is a VMware ESXi™ hypervisor provided as part of the VMware vSphere® solution made commercially available from VMware, Inc. of Palo Alto, Calif. (although it should be recognized that any other virtualization technologies, including Xen® and Microsoft Hyper-V® virtualization technologies may be utilized consistent with the teachings herein). Although only one VM 120 is shown in the example, hypervisor 118 can concurrently support multiple VMs. Hypervisor 118 includes a kernel 134. Kernel 134 maintains NPTs 136 on behalf of its VM(s), which are exposed to CPU 108. Hypervisor 118 also includes a security service 138 and a handler 140, which are discussed below.

Each VM supported by hypervisor 118 includes guest software that runs on the virtualized resources supported by hardware platform 106. In the example shown, the guest software of VM 120 includes a guest operating system (OS) 126, a security agent 126, and one or more application(s) 129. Guest OS 126 can be any commodity operating system known in the art, such as Linux®, Microsoft Windows®, Mac OS®, or the like. Guest OS 126 includes a kernel 122 (also referred to as "guest kernel 122") and kernel patch protection (KPP) software 127. KPP software 127 is configured to periodically check that code and data structures of kernel 122 ("protected code" and "protected data structures") have not been modified. If KPP software 127 detects a modification of the protected code/data structures, KPP software 127 initiates a protection procedure (e.g., performs a bug check and shuts down guest OS 126). Guest OS 126 supports execution of various software, including security agent 126 and application(s) 129. Guest OS 126 maintains GPTs 124 for mapping virtual addresses to guest-physical addresses.

Security agent 126 is software configured to perform one or more security function(s), such as monitoring for the presence of malicious software (e.g., viruses, malware, rootkits, etc.). Security agent 126 is configured to intercept various events that occur in guest OS 126, such as file system/registry activity, process/thread creation, module load/unloads, and the like. Security agent 126 is configured to patch kernel 122 to intercept one or more events of interest. Security agent 126 cooperates with security service 138 of hypervisor 118 to patch kernel 122 in a manner that is undetectable by KPP software 127. In general, security agent 126 and hypervisor 118 cooperate to present patched kernel code in the execution stream and original (unpatched) kernel code in the data stream. Since the patched kernel code is in the execution stream, guest OS 126 will execute the patched kernel code, allowing security agent 126 to intercept the events of interest. Any software in guest OS 126 that desires to read the kernel code is presented the original kernel code. In this manner, when KPP software 127 executes read operations to verify the kernel code, KPP software 127 is presented with the original kernel code. In an embodiment, hypervisor 118 implements this kernel patch transparency by modifying entries in NPTs 136 to cause an exception to hypervisor 118 when software in VM 120 attempts to read code of kernel 122 that has been patched. When handling the exception, hypervisor 118 emulates the read operation, but targets the original kernel code rather than the patched kernel code.

Figure 2:
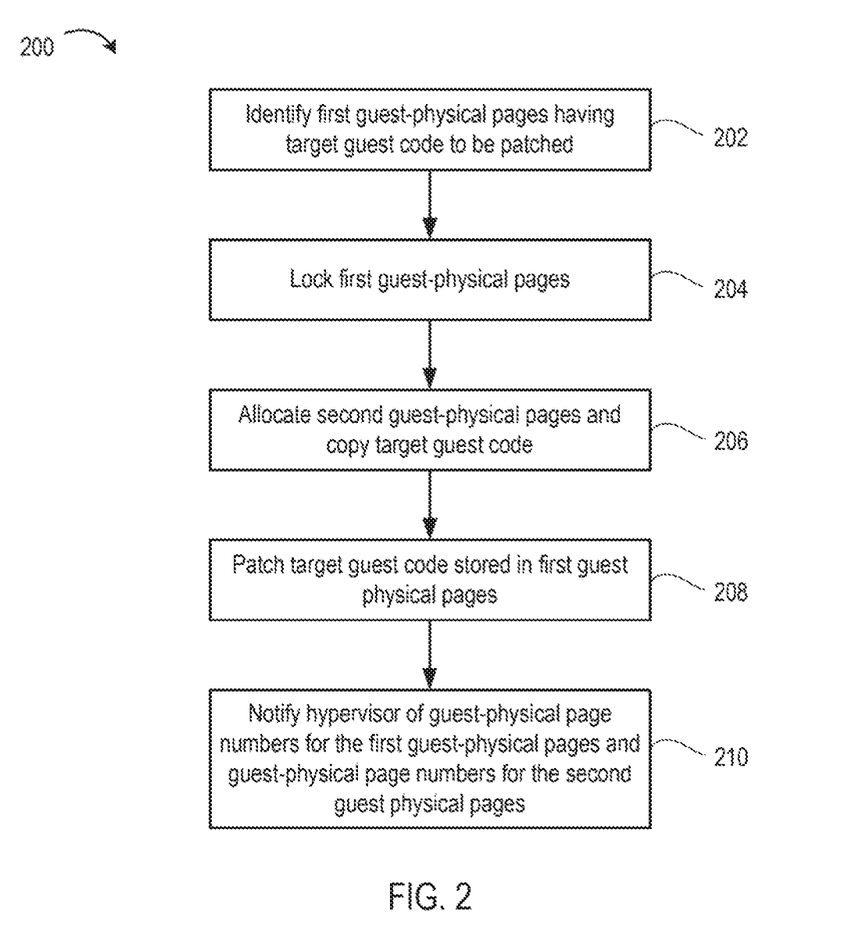
FIG. 2 is a flow diagram depicting a method of patching guest code according to an embodiment.

FIG. 2 is a flow diagram depicting a method 200 of patching guest code according to an embodiment. Method 200 is performed by security agent 126 to patch code of kernel 122 that is protected by KPP software 127. Method 200 begins at step 202, where security agent 126 identifies first guest-physical pages (GPPs) having protected code to be patched ("target guest code"). At step 204, security agent 126 locks the first GPPs. This prevents the possibility that the target guest code will be swapped to disk and back to different GPPs. At step 206, security agent 126 allocates second GPPs and copies the target guest code into the second guest physical pages.

At step 208, security agent 126 patches the target guest code stored in the first GPPs. Thus, the first GPPs store a patched version of the target guest code, while the second GPPs store the original version of the target guest code. As described above, security agent 126 patches code of kernel 134 to intercept various events. At step 210, security agent 126 notifies hypervisor 118 of guest-physical page numbers (GPPNs) for the first GPPs and GPPNs for the second GPPs, in an embodiment, security agent 126 communicates the two sets of GPPNs to security service 138. As described further below, security service 138 configures entries in NPTs 136 so that VM 120 is presented the patched target guest code in the execution stream and the original target guest code in the data stream.

Figure 5:
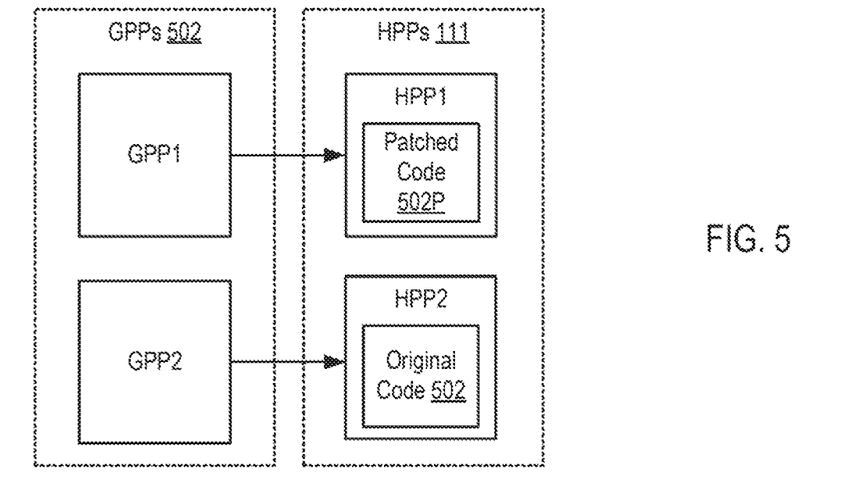
FIG. 5 is a block diagram depicting a relationship between guest-physical pages and host-physical pages according to an embodiment.

FIG. 5 is a block diagram depicting a relationship between guest-physical pages and host-physical pages according to an embodiment. A plurality of GPPs 502 includes a first GPP ("GPP1") and a second GPP ("GPP2"). A plurality of host-physical pages (HPPs) 111 includes a first HPP ("HPP1") and a second HPP ("HPP2"). Hypervisor 118 maps GPP1 to HPP1 and GPP2 to HPP2 by configuring NPTs 136 accordingly. HPP2 stores original guest code 502. HPP1 stores patched guest code 502P. When performing method 200, security agent 126 identifies that guest OS 126 has stored target guest code to be patched in GPP1, which hypervisor 118 has mapped to HPP1 (step 202). Security agent 126 allocates GPP2 (which hypervisor has mapped to HPP2) to store an original version of the target guest code (e.g., original guest code 502) (step 206). Security agent 126 then patches the target guest code to generate patched code 502P. Security agent 126 can perform these functions for any number of GPPs having target guest code to be patched.

Figure 3:
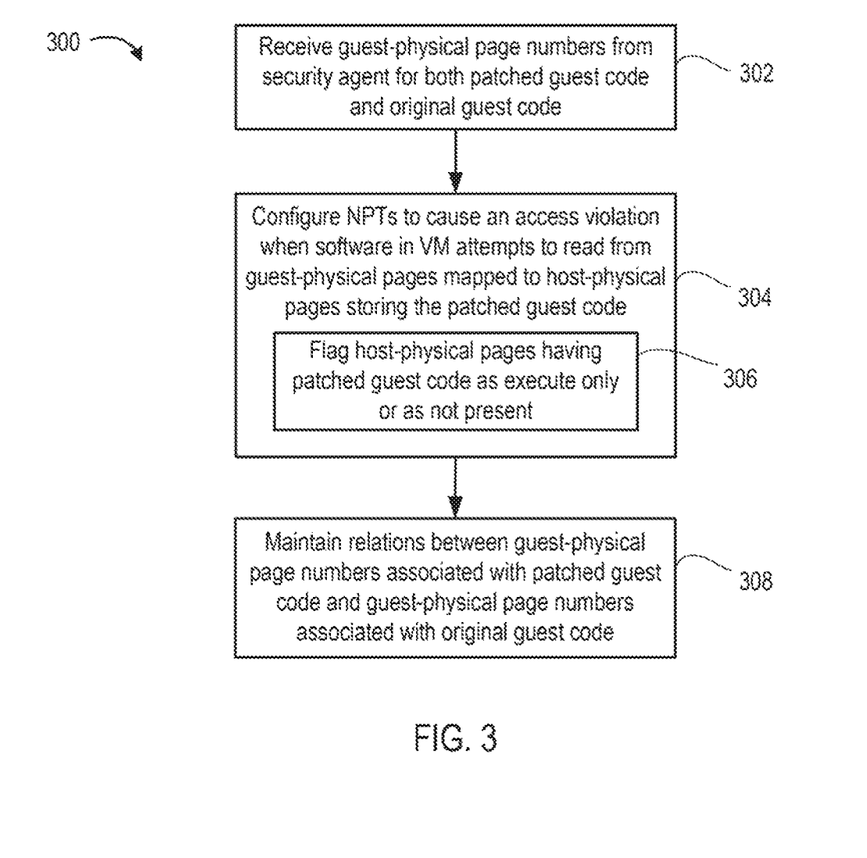
FIG. 3 is a flow diagram depicting a method of configuring nested page tables according to an embodiment.

FIG. 3 is a flow diagram depicting a method 300 of configuring nested page tables according to an embodiment. Method 300 is performed by security service 138 (or generally by hypervisor 118). Method 300 begins at step 302, where security service 138 receives sets of GPPNs from security agent 126 that correspond to both the target guest code that has been patched ("patched guest code") and the original target guest code ("original guest code"). At step 304, security service 138 configures NPTs 136 to cause an access violation when software installed in VM 120 attempts to read from GPPs that store the patched guest code.

Depending on hardware support, there are different techniques for causing an access violation when software installed in VM 120 attempts to read from GPPs that stored the patched guest code. In an embodiment, at step 306, security service 138 flags HPPs having the patched guest code as execute only (assuming hardware support). With this technique, executing patched code will not cause access violations and VM exits. However, attempting to read the patched code will cause an access violation and VM exit, where hypervisor 118 can then emulate the faulting instruction by fetching data from the page having the original code. In another embodiment, at step 306, security service 138 flags HPPs having the patched guest code as not present (assuming hardware support). With this technique, any attempt to read or execute the patched code will cause an access violation and VM exit, where the hypervisor 118 can then emulate the faulting instruction to read from the original code in case of a read operation or execute the patched code in case of an execute operation. This technique is less performant than the technique of marking patched code as execute only, since a VM exit occurs for both reads and executes rather than just for reads. In either technique, any read operation targeting a GPP mapped to an HPP that is flagged as execute only or not present will generate an exception (e.g., a NPT violation, page fault, or the like). Hypervisor 118 configures CPU 108 to invoke handler 140 in response to NPT violations or page faults due to a set NP flag in an NPT (e.g., such exceptions cause VM exits to hypervisor 118). At step 308, security service 138 maintains relations between GPPNs associated with the patched guest code and GPPNs associated with the original guest code.

In the example of FIG. 5, the security agent 126 sends GPPNs for GPP1 and GPP2 to security service 138 (step 302). Security service 138 modifies NPTs 136 to cause an exception if software in VM attempts to read from GPP1 (step 304). Security service 138 maintains a relation between GPP1 and GPP2, which is accessible by handler 140 during exception processing.

Figure 6:
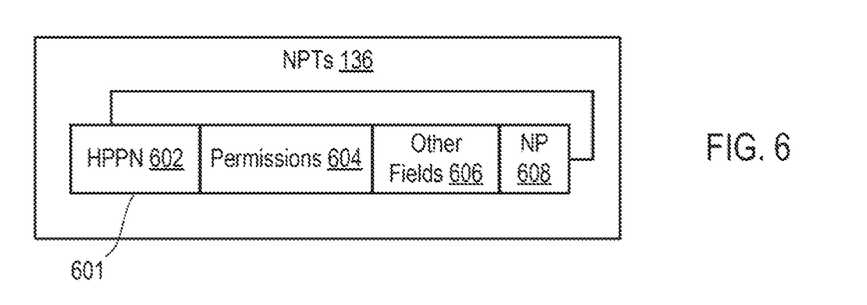
FIG. 6 is a block diagram depicting nested page tables according to an embodiment.

FIG. 6 is a block diagram depicting NPTs 136 according to, an embodiment. NPTs 136 include entries 601. Each entry 601 includes a host-physical page number (HPPN) 602, permissions 604, and various other fields 606. HPPN 602 is a host-physical address of a particular HPN 111. Permissions 604 include read/write/execute permissions, each of which can be individually set or upset. Other fields 606 can include reserved bits, ignored bits, or other hardware-dependent fields used by MMU 132. If a read operation causes an address translation that reaches an NPT entry marked execute-only, MMU 132 triggers an NPT violation exception, which causes VM exit to hypervisor 118. In some embodiments, entry 601 can include a not present (NP) field 608. NP field 608 can be unset to indicate that the corresponding HPP is present in memory 110 or set to indicate that the corresponding HPP is not present in memory 110. If any operation (read, write, execute) causes an address translation that reaches an NPT entry marked not present, MMU 132 triggers a page fault, which causes a VM exit to hypervisor 118. Entry 601 can include permissions 604, NP field 608, or both, depending on the architecture of MMU 132.

Figure 7:
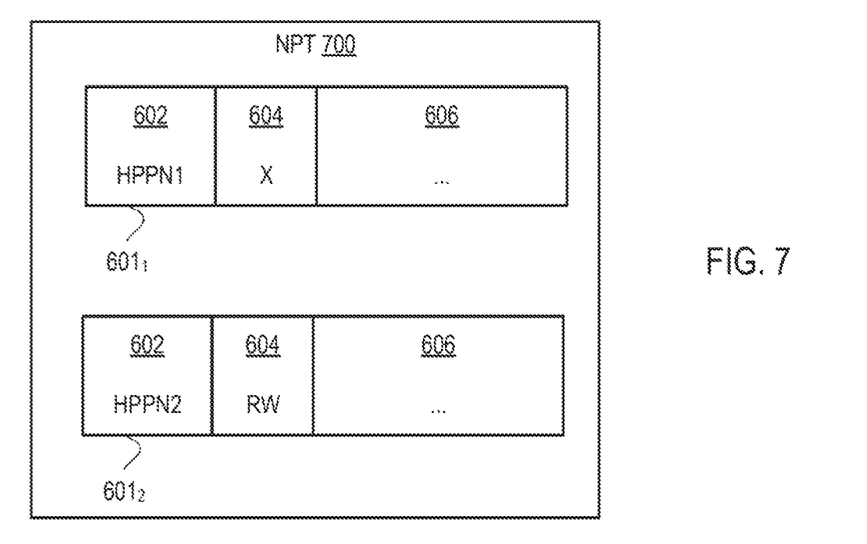
FIG. 7 is a block diagram depicting a nested page table according to an example.

FIG. 7 is a block diagram depicting an NPT 700 according to an example. NPT 700 is a table in NPTs 136 configured according to the example of FIG. 5. In NPT 700, an entry $601_1$ points to HPPN1 (the identifier for HPP1 that stores patched guest code 502P), and an entry $601_2$ points to HPPN2 (the identifier for HPP2 that stores original guest code 502). In the embodiment, permissions field 604 of entry $601_1$ is set to execute-only (X). Permissions field 604 of entry $601_2$ can be set to read/write (RW). This will cause an NPT violation if software in VM 120 attempts to read from GPP1. In the embodiment, entries $601_1$ and $601_2$ do not include NP field 608. In other embodiments, entries $601_1$ and $601_2$ can include NP field 608 in addition to permissions field 604 or in absence of permissions field 604. In any case, NP field 608 of entry $601_1$ (if present) can be set to cause an exception if software in VM 120 attempts to read from GPP1.

Figure 4:
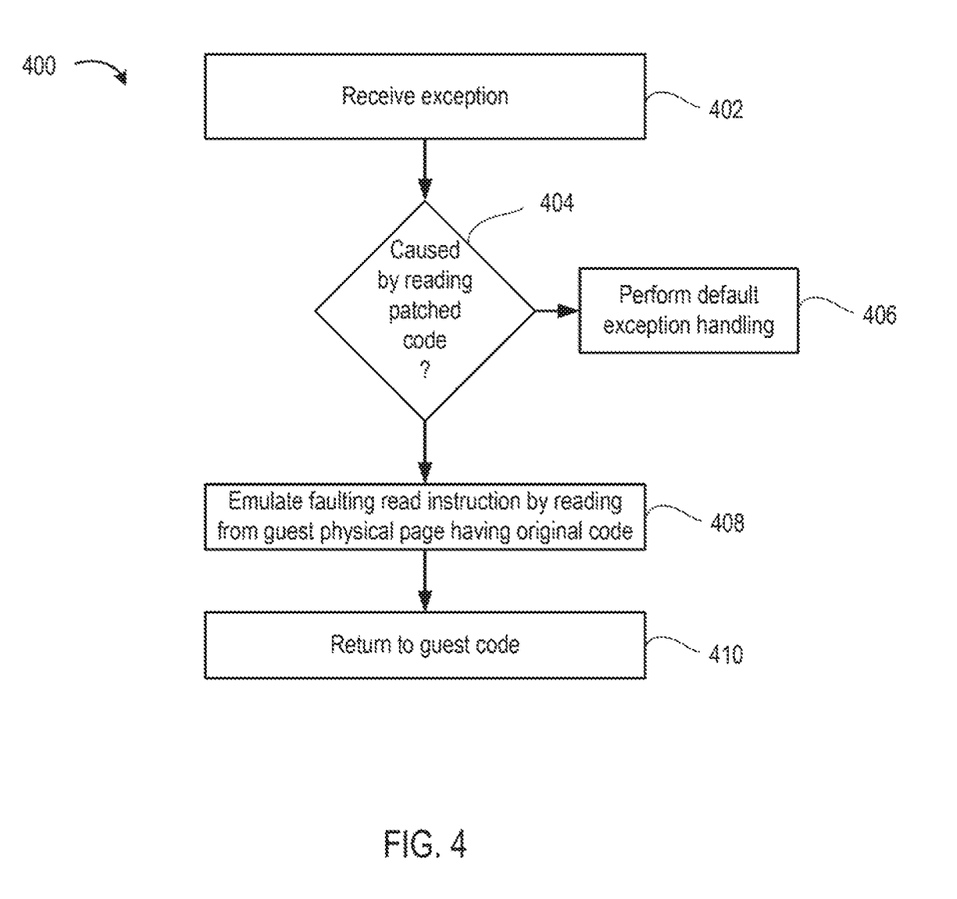
FIG. 4 is a flow diagram depicting a method of handling an exception in a hypervisor according to an embodiment.

FIG. 4 is a flow diagram depicting a method 400 of handling an exception in hypervisor 118 according to an embodiment. Method 400 is performed by handler 140 in hypervisor 118. Method 400 begins at step 402, where handler 140 receives an exception (e.g., due to NPT violation or page fault, as discussed above). At step 404, handler 140 determines whether the exception was caused by software in VM 120 attempting to read from a GPP mapped to an HPP storing the patched guest code. Handler 140 has access to the relations between GPPNs for the first GPPs associated with the patched guest code and the second GPPs associated with the original guest code. If the exception indicates that the faulting instruction attempted to read the patched guest code, method 400 proceeds to step 408. Otherwise, method 400 proceeds to step 406, where handler 140 performs default exception handling based on the exception.

At step 408, handler 140 emulates the faulting read instruction by executing a similar read instruction, but targeting the original guest code rather than the patched guest code. Handler 140 obtains the GPPN that maps to the original guest code from the relations maintained by security service 138. At step 410, handler 140 returns from the exception to the instruction after the faulting instruction.

That is, the faulting instruction (e.g., a read operation targeting the patched guest code) is not executed.

In the example of FIG. 5 and FIG. 7, KPP software 127 can attempt a read operation targeting GPP1 during its verification operation (e.g., mov RAX, <offset1 in frame of GPP1>). Since GPP1 is mapped to HPP1 by entry $601_1$, and since permissions 604 of entry $601_1$ are set to execute only, MMU 132 causes an exception (e.g., NPT violation), which in turn causes a VM exit to hypervisor 118. The exception is routed to handler 140, which determines that the faulting read operation has targeted GPP1. Handler 140 then determines from the relations maintained by security service 138 that GPP2 is associated with GPP1. Handler 140 then emulates the faulting read operation, but targeting GPP2 rather than GPP1 (e.g., mov RAX, <offset1 in frame of GPP2>).

Techniques for code management in a virtualized computer system have been described. In an embodiment, a security agent installed in a VM and a security service of the hypervisor cooperate to implement guest OS kernel patching in a manner transparent to KPP software of the guest OS. In general, a hypervisor manages a virtualized computing instance. The hypervisor receives an identifier (e.g., page number) for a first guest-physical memory page, which stores a patched version of guest code in the virtualized computing instance (e.g., patched kernel code). The hypervisor also receives an identifier (e.g., page number) for a second guest-physical memory page, which stores an original version of the guest code (e.g., unpatched kernel code). The hypervisor modifies an entry in a nested page table, which is associated with the first guest-physical memory page, to cause an exception to the hypervisor in response to a first read operation, performed by first software in the virtualized computing instance (e.g., KPP software), which targets the first guest-physical memory page. In response to receiving an exception, the hypervisor executes a second read operation that emulates the first read operation, but targets the second guest-physical memory page (which stores the original kernel code) rather than the first guest-physical memory page (which stores the patched kernel code).

The techniques described herein can be used in other applications. For example, some software provides for "code detours," which extend software functionality, analyze the system for runtime behavior, provide debugging/support, allow for dynamic patching of code (code "hot-patching"), and the like. To implement the code detours, it is necessary for the software to add code or make changes to running code. In a debugging scenario, software vendors typically instrument code and ship debug binaries. In most cases, these debug binaries are not tested to production quality and are thus not signed. The user is thus required to disable the code signing feature of the OS to run the debug binaries. The same holds true for other types of code detours. In general, modifying the signed code will result in the OS preventing execution of the patched code. Disabling the code signing feature of the OS renders the machines open to attacks and is undesirable, particularly in production environments. Using the techniques described herein, an agent, which functions to patch signed code to create detours, executes as described above with respect to security agent 126. But rather than patching kernel code, the agent patches the signed code being detoured. The agent and the hypervisor cooperate to present the patched code in the execution stream and the original code in the data stream. Thus, when the OS reads the code during a code signature check operation, the OS is presented with the original signed code in the data stream. However, when the OS executes the code, the patched code is executed, which includes the desired detours.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system— computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)-CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of managing guest code in a virtualized computing instance of a virtualized computing system, the method comprising:

receiving, at a hypervisor that manages the virtualized computing instance, identifiers for a first guest-physical memory page, which stores a patched version of the guest code, and a second guest-physical memory page, which stores an original version of the guest code;

configuring a nested page table (NPT) to include a first entry that points to the first guest-physical memory page and a second entry that points to the second guest-physical page, wherein the first entry in a nested page table (NPT), which is associated with the first guest-physical memory page, is modified to cause an exception to the hypervisor in response to a first read operation, performed by first software in the virtualized computing instance, which targets the first guest-physical memory page while using the first entry to present the patched version of the guest code in an execution stream of the virtual computing instance;

receiving a read operation directed to the first guest-physical memory page causing an exception that exits the virtualized computing instance to the hypervisor; and executing, at the hypervisor in response to the exception, a second read operation that emulates the first read operation, but targets the second entry that points to the second guest-physical memory page storing the original version of the guest code.

2. The method of claim 1, wherein the guest code is part of a kernel of a guest operating system (OS), and wherein the first software is kernel patch protection (KPP) software of the guest OS.

3. The method of claim 1, wherein the step of modifying the entry in the NPT comprises:

setting permissions in the entry to execute-only.

4. The method of claim 1, wherein the step of modifying the entry in the NPT comprises:

setting a not-present flag in the entry.

5. The method of claim 1, wherein the virtualized computing instance includes second software installed therein, and wherein the hypervisor receives the identifiers for the first and second guest-physical memory pages from the second software.

6. The method of claim 5, further comprising:

identifying, by the second software, the first guest-physical memory page, which initially stores the guest code;

allocating, by the second software, the second guest-physical memory page;

copying, by the second software, the guest code to the second guest-physical memory page as the original version of the guest code; and patching, by the second software, the guest code stored on the first guest-physical memory page to generate the patched version of the guest code.

7. The method of claim 1, further comprising:

returning from the exception to an instruction of the first software after the first read operation.

8. A non-transitory computer readable medium having instructions stored thereon that when executed by a processor cause the processor to perform a method of managing guest code in a virtualized computing instance of a virtualized computing system, the method comprising:

receiving, at a hypervisor that manages the virtualized computing instance, identifiers for a first guest-physical memory page, which stores a patched version of the guest code, and a second guest-physical memory page, which stores an original version of the guest code;

configuring a nested page table (NPT) to include a first entry that points to the first guest-physical memory page and a second entry that points to the second guest-physical page, wherein the first entry in a nested page table (NPT), which is associated with the first guest-physical memory page, is modified to cause an exception to the hypervisor in response to a first read operation, performed by first software in the virtualized computing instance, which targets the first guest-physical memory page while using the first entry to present the patched version of the guest code in an execution stream of the virtual computing instance;

receiving a read operation directed to the first guest-physical memory page causing an exception that exits the virtualized computing instance to the hypervisor; and executing, at the hypervisor in response to the exception, a second read operation that emulates the first read operation, but targets the second entry that points to the second guest-physical memory page storing the original version of the guest code.

9. The non-transitory computer readable medium of claim 8, wherein the guest code is part of a kernel of a guest operating system (OS), and wherein the first software is kernel patch protection (KPP) software of the guest OS.

10. The non-transitory computer readable medium of claim 8, wherein the step of modifying the entry in the NPT comprises:

setting permissions in the entry to execute-only.

11. The non-transitory computer readable medium of claim 8, wherein the step of modifying the entry in the NPT comprises:

setting a not-present flag in the entry.

12. The non-transitory computer readable medium of claim 8, wherein the virtualized computing instance includes second software installed therein, and wherein the hypervisor receives the identifiers for the first and second guest-physical memory pages from the second software.

13. The non-transitory computer readable medium of claim 12, further comprising:

identifying, by the second software, the first guest-physical memory page, which initially stores the guest code;

allocating, by the second software, the second guest-physical memory page;

copying, by the second software, the guest code to the second guest-physical memory page as the original version of the guest code; and patching, by the second software, the guest code stored on the first guest-physical memory page to generate the patched version of the guest code.

14. The non-transitory computer readable medium of claim 8, further comprising:

returning from the exception to an instruction of the first software after the first read operation.

15. A virtualized computer system, comprising:

a hardware platform including a processor and a memory; and a software platform comprising code stored in the memory and executing on the processor of the hardware platform, the software platform including a hypervisor supporting a virtualized computing instance, the virtualized computing instance including guest code and first software, the hypervisor configured to:

receive identifiers for a first guest-physical memory page, which stores a patched version of the guest code, and a second guest-physical memory page, which stores an original version of the guest code;

configuring a nested page table (NPT) to include a first entry that points to the first guest-physical memory page and a second entry that points to the second guest-physical page, wherein the first entry in a nested page table (NPT), which is associated with the first guest-physical memory page, is modified to cause an exception to the hypervisor in response to a first read operation, performed by the first software, which targets the first guest-physical memory page while using the first entry to present the patched version of the guest code in an execution stream of the virtual computing instance;

receive a read operation directed to the first guest-physical memory page causing an exception that exits the virtualized computing instance to the hypervisor; and execute a second read operation that emulates the first read operation, but targets the second entry that points to the second guest-physical memory page storing the original version of the guest code.

16. The virtualized computer system of claim 15, wherein the guest code is part of a kernel of a guest operating system (OS), and wherein the first software is kernel patch protection (KPP) software of the guest OS.

17. The virtualized computer system of claim 15, wherein the hypervisor is configured to modify the entry in the NPT by setting permissions in the entry to execute-only.

18. The virtualized computer system of claim 15, wherein the hypervisor is configured to modify the entry in the NPT by setting a not-present flag in the entry.

19. The virtualized computer system of claim 15, wherein the virtualized computing instance includes second software installed therein, and wherein the hypervisor is configured to receive the identifiers for the first and second guest-physical memory pages from the second software.

20. The virtualized computer system of claim 19, wherein the second software is executable by the processor to:

identify the first guest-physical memory page, which initially stores the guest code;

allocate the second guest-physical memory page;

copy the guest code to the second guest-physical memory page as the original version of the guest code; and patch the guest code stored on the first guest-physical memory page to generate the patched version of the guest code.

* * * * *